F. C. WRIGHT.
Axle-Lubricator for Vehicles.

No. 211,539.          Patented Jan. 21, 1879.

UNITED STATES PATENT OFFICE.

FOUNTAIN C. WRIGHT, OF SELMA, ALABAMA.

IMPROVEMENT IN AXLE-LUBRICATORS FOR VEHICLES.

Specification forming part of Letters Patent No. 211,539, dated January 21, 1879; application filed November 30, 1878.

*To all whom it may concern:*

Be it known that I, FOUNTAIN C. WRIGHT, of Selma, in the county of Dallas and State of Alabama, have invented certain new and useful Improvements in Self-Lubricating Attachments; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates to that class of caps or devices employed upon the hubs of carriage-wheels for the double purpose of imparting a finished appearance to their outer ends and preventing the loss of the lubricant used for reducing the friction of the hub upon the axle, the object being to so construct the cap that it may be applied to the hub-bands now in use, as well as to those especially constructed for its reception; and it consists in providing the cap with an inner band or stop, and the application of a rubber gasket between the cap and hub-band, as will be hereinafter fully described.

Figure 1:
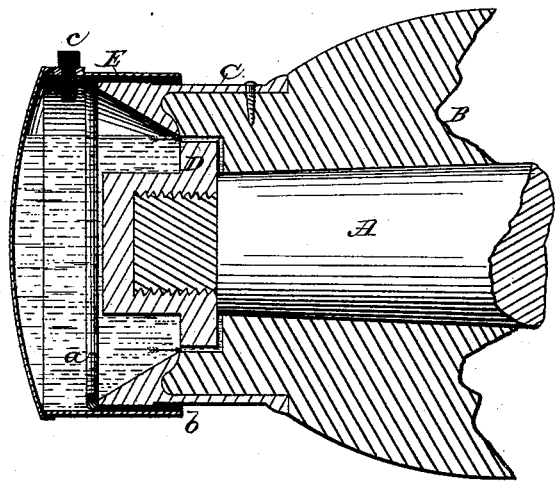
Figure 2:
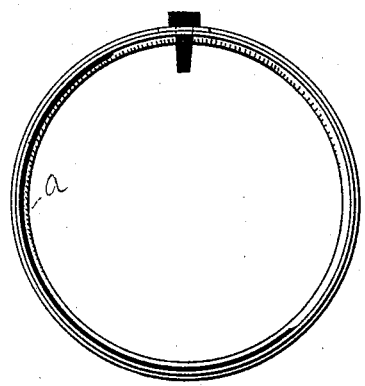

In the accompanying drawings, Figure 1 is a longitudinal section of the cap and a part of the hub to which it is applied. Fig. 2 is an end view of the cap, showing its interior, with the stop used to prevent it from passing too far onto the hub.

In describing fully this invention and referring to the drawings, let A be the axle of a carriage-wheel; B, the hub, and C the hub-band. These parts are constructed and applied in the ordinary manner, as is also the nut D, upon the end of the axle, which prevents the hub from leaving it. This completes the arrangement of parts as commonly used, but it is subject to the following defects: The oil or other lubricant runs out between the nut and hub, rendering it difficult to use anything better than a stiff grease, and even this will work out, so as to soon leave the axle dry; and in carriages used for the conveyance of passengers much trouble is caused by the great care necessary to prevent wheel-grease from getting on and injuring their clothing, while dust and grit enter without restraint, soon destroying the parts.

To avoid these difficulties I provide the end of the hub with an oil-tight cup or cap, E, which is constructed of any suitable metal, and of a little greater diameter than the hub-band, so as to admit the insertion of a rubber gasket, *b*, between them. This gasket may be placed within the cap, and is prevented from passing too far in as the cap is pressed upon the hub or hub-band by a stop, *a*, soldered or otherwise secured within the cap at the point which it is desired shall limit the entrance of the hub. An oil-hole is made in the cap, and provided with a suitable stopper or plug, *c*, which may be screwed into the hole, or made to retain its position by friction alone. When the cup is in place oil may be poured into it, (through this oil-hole,) and will find its way gradually, as needed, to the axle, through the space between the nut and end of the hub.

This cap may have any ornamental device desired cast or otherwise formed upon it, thus making it both ornamental and useful. Among the advantages gained by this arrangement is the great facility afforded for removing and replacing the cap, no wrenches or other implements being required, and the perfect manner in which the lubricant is retained in contact with the axle and the exclusion of dust.

Having thus described my invention, I claim as new, and desire to secure by Letters Patent, the following:

The cap heretofore described, provided with the internal stop *a*, in combination with the rubber gasket *b* and the hub or hub-band of a carriage-wheel, substantially as and for the purpose set forth.

In testimony that I claim the foregoing as my own I affix my signature in presence of two witnesses.

FOUNTAIN C. WRIGHT.

Witnesses:
 WM. C. WARD,
 JNO. C. REID.